United States Patent
Shin et al.

(10) Patent No.: US 10,712,603 B2
(45) Date of Patent: Jul. 14, 2020

(54) THREE-DIMENSIONAL IMAGE DISPLAY APPARATUS INCLUDING DIFFRACTIVE COLOR FILTER

(71) Applicant: SAMSUNG ELECTRONICS CO., LTD., Suwon-si (KR)

(72) Inventors: Bongsu Shin, Seoul (KR); Hyunjoon Kim, Seoul (KR); Joonyong Park, Suwon-si (KR); Dongouk Kim, Pyeongtaek-si (KR); Jihyun Bae, Seoul (KR); Dongsik Shim, Hwaseong-si (KR); Sunghoon Lee, Seoul (KR); Jaeseung Chung, Suwon-si (KR); Seogwoo Hong, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 4 days.

(21) Appl. No.: 15/404,717

(22) Filed: Jan. 12, 2017

(65) Prior Publication Data
US 2017/0199420 A1    Jul. 13, 2017

(30) Foreign Application Priority Data
Jan. 12, 2016  (KR) .................... 10-2016-0003674

(51) Int. Cl.
*G02F 1/1335* (2006.01)
*F21V 8/00* (2006.01)
(Continued)

(52) U.S. Cl.
CPC ....... *G02F 1/133504* (2013.01); *G02B 6/005* (2013.01); *G02B 30/26* (2020.01);
(Continued)

(58) Field of Classification Search
CPC ............ G02F 1/1335; G02F 1/133504; G02F 1/133514; G02B 6/0046
See application file for complete search history.

(56) References Cited

U.S. PATENT DOCUMENTS 7,579,775 B2 *  8/2009  Song .................... H01L 27/322
                                                    313/112
7,699,482 B2 *  4/2010  Noguchi ............ H01L 51/5262
                                                    362/244
(Continued)

FOREIGN PATENT DOCUMENTS

JP          5023324 B2     9/2012
KR    10-2010-0046098 A    5/2010
(Continued)

OTHER PUBLICATIONS

Communication dated Sep. 21, 2017, from the European Patent Office in counterpart European Application No. 17150698.3.
(Continued)

*Primary Examiner* — Dung T Nguyen
(74) *Attorney, Agent, or Firm* — Sughrue Mion, PLLC (57) ABSTRACT

A three-dimensional (3D) image display apparatus includes a backlight unit configured to provide collimated white light, and a display panel configured to modulate the light provided from the backlight unit based on image information and to display the light in a plurality of viewing zones. The display panel includes a diffractive color filter in which a diffractive element for providing directivity is disposed on a color filter, thereby improving an optical efficiency in 3D image formation.

22 Claims, 10 Drawing Sheets

(51) Int. Cl.
| | |
|---|---|
| *G02B 30/26* | (2020.01) |
| *H04N 13/305* | (2018.01) |
| *H04N 13/356* | (2018.01) |
| *G02B 27/42* | (2006.01) |
| *H04N 13/324* | (2018.01) |
| *G02B 5/20* | (2006.01) |
| *G02B 5/18* | (2006.01) |

(52) U.S. Cl.
CPC ............ *G02B 5/1819* (2013.01); *G02B 5/201* (2013.01); *G02B 27/4205* (2013.01); *G02F 1/133514* (2013.01); *G02F 2201/121* (2013.01); *G02F 2201/123* (2013.01); *G02F 2202/023* (2013.01); *H04N 13/305* (2018.05); *H04N 13/324* (2018.05); *H04N 13/356* (2018.05)

(56) References Cited

U.S. PATENT DOCUMENTS

| | | | |
|---|---|---|---|
| 9,383,589 | B2 | 7/2016 | Cho et al. |
| 2005/0062928 | A1* | 3/2005 | Yau .................... G02B 5/1838 349/201 |
| 2006/0227259 | A1 | 10/2006 | Mi et al. |
| 2007/0159577 | A1 | 7/2007 | Atsushi et al. |
| 2008/0094547 | A1 | 4/2008 | Sugita et al. |
| 2010/0020566 | A1 | 1/2010 | Teng |
| 2010/0073599 | A1 | 3/2010 | Yoon et al. |
| 2012/0206677 | A1 | 8/2012 | Chung et al. |
| 2014/0043856 | A1 | 2/2014 | Thompson et al. |
| 2014/0176413 | A1 | 6/2014 | Jung et al. |
| 2014/0293187 | A1 | 10/2014 | Nam et al. |
| 2014/0300840 | A1 | 10/2014 | Fattal et al. |
| 2014/0300947 | A1 | 10/2014 | Fattal et al. |
| 2014/0300960 | A1 | 10/2014 | Santori et al. |
| 2015/0009307 | A1 | 1/2015 | Lee et al. |
| 2015/0029438 | A1 | 1/2015 | Chung et al. |
| 2015/0036068 | A1 | 2/2015 | Fattal et al. |
| 2015/0062500 | A1 | 3/2015 | Park et al. |
| 2016/0131810 | A1 | 5/2016 | Takada et al. |
| 2017/0199420 | A1 | 7/2017 | Shin et al. |
| 2017/0329149 | A1 | 11/2017 | Fattal |
| 2018/0081190 | A1 | 3/2018 | Lee et al. |
| 2018/0107011 | A1 | 4/2018 | Lu et al. |

FOREIGN PATENT DOCUMENTS

| | | |
|---|---|---|
| KR | 10-2010-0084020 A | 7/2010 |
| KR | 10-1007198 B1 | 1/2011 |
| KR | 10-2013-0017886 A | 2/2013 |
| KR | 10-1282138 B1 | 7/2013 |
| KR | 10-1392063 B1 | 5/2014 |
| KR | 10-2014-0081221 A | 7/2014 |
| KR | 10-2018-0032356 A | 3/2018 |
| WO | 2005011292 A1 | 2/2005 |
| WO | 2014/081415 A1 | 5/2014 |

OTHER PUBLICATIONS

Partial European Search Report dated Jun. 8, 2017 by the European Patent Office in counterpart European Application No. 17150698.3.
Jason Geng, "Three-dimensional display technologies", Advances in Optics and Photonics, Nov. 22, 2013, pp. 456-535, vol. 5, No. 4, Rockville, Maryland, USA.
David Fattal, et al., "A multi-directional backlight for a wide-angle, glasses-free three-dimensional display", Nature, Mar. 21, 2013, pp. 348-351, vol. 495, No. 7441, Macmillan Publishers, United Kingdom.
Deng-Ke Yang, et al., "Liquid Crystal Display Components" in "Fundamentals of Liquid Crystal Devices, 2nd Edition", Nov. 30, 2014, pp. 514, Wiley.
Shunsukue Kobayashi, et al., "Optical Components of Backlights" in "LCD Backlights", Apr. 30, 2009, pp. 66-67, John Wiley &Sons, Incorporated, Great Britain.
Notice of Allowance dated May 21, 2019 issued by the U.S. Patent and Trademark Office in U.S. Appl. No. 15/440,535.
Advisory Action dated Mar. 27, 2109 issued by the U.S. Patent and Trademark Office in U.S. Appl. No. 15/440,535.
Office Action dated Jan. 10, 2019 issued by the U.S. Patent and Trademark Office in U.S. Appl. No. 15/440,535.
Office Action dated Aug. 28, 2018 issued by the U.S. Patent and Trademark Office in U.S. Appl. No. 15/440,535.
Office Action dated Jun. 5, 2018 issued by the U.S. Patent and Trademark Office in U.S. Appl. No. 15/440,535.

* cited by examiner

THREE-DIMENSIONAL IMAGE DISPLAY APPARATUS INCLUDING DIFFRACTIVE COLOR FILTER

CROSS-REFERENCE TO RELATED APPLICATION

This application claims priority from Korean Patent Application No. 10-2016-0003674, filed on Jan. 12, 2016, in the Korean Intellectual Property Office, the disclosure of which is incorporated herein by reference in its entirety.

BACKGROUND

1. Field

Exemplary embodiments relate to a three-dimensional (3D) image display apparatus for implementing a 3D image by using a diffraction effect.

2. Description of the Related Art

Recently, many three-dimensional (3D) movies have been released, and techniques related to 3D image display apparatuses have also been studied a lot. The 3D image display apparatus displays a 3D image based on binocular parallax. 3D image display apparatuses currently used in common employ binocular parallax and provide a left-view image and a right-view image having different points of view to the left eye and the right eye of a viewer, respectively, to enable the viewer to feel a 3D effect. The 3D image display apparatuses may be classified into a glasses-type 3D image display apparatus and a glasses-free 3D image display apparatus.

As the glasses-type 3D image display apparatus, a red-green glasses type is used for movie theaters and a polarized glasses type or a liquid crystal shutter type is used for televisions (TVs). The glasses-free 3D image display apparatus is classified into a barrier type and a lenticular type based on a structure, and is classified into a multi-view rendering type, a volumetric type that displays any information relating to a 3D space in the 3D space in the form of voxels, an integral imaging type that captures images at various angles through compound eyes of insects (e.g., eyes of the housefly) and displays the images reversely, and a holographic type, and a directional backlight unit type based on an image implementation type.

SUMMARY

Provided is a 3D image display apparatus that implements a 3D image by using a diffraction effect.

Additional aspects will be set forth in part in the description which follows and, in part, will be apparent from the description, or may be learned by practice of the presented exemplary embodiments.

According to an aspect of an exemplary embodiment, a 3D image display apparatus includes a backlight component configured to provide collimated white light and a display panel configured to modulate light received from the backlight component based on image information, the display panel including a display element layer comprising a plurality of pixel regions which are independently controllable and a diffractive color filter configured to perform color conversion with respect to white light that has propagated through the display element layer and to diffract the light toward a plurality of viewing zones.

The diffractive color filter may have a color filter array layer and a diffractive element that is disposed adjacent to the color filter array layer.

In the diffractive color filter, the color filter array layer and the diffractive element may be disposed such that the light that has propagated through the display element layer propagates through the color filter array layer and is incident to the diffractive element.

In the diffractive color filter, the color filter array layer and the diffractive element may be formed integrally with respect to each other.

In the diffractive color filter, the color filter array layer and the diffractive element may be disposed such that the light that has propagated through the display element layer is diffracted by the diffractive element and is incident to the color filter array layer.

Each of the diffractive element and the color filter array layer may be formed of a same material.

The diffractive element may be formed of a photo-curable polymer material.

The diffractive element may have a plurality of diffractive element components disposed repeatedly, each of the plurality of diffractive element components may include a plurality of sections, a number of which is equal to a number of the plurality of viewing zones, each of the plurality of sections may include a respective grating element configured to adjust a direction in which the light that propagates through the display element layer is emitted, and the grating element may include a plurality of grating subelements.

The color filter array layer may be formed by repeatedly arranging a plurality of color filters configured to facilitate a propagation of light in different colors, and each respective one from among the plurality of color filters may be disposed to face a corresponding one from among the plurality of grating subelements.

Gratings included in each of the plurality of grating subelements may have an arrangement direction and an arrangement interval, at least one of which varies from grating subelement to grating subelement.

The display panel may include a lower substrate in which a plurality of pixel electrodes are formed, an upper substrate in which a common electrode is formed and disposed to face the plurality of pixel electrodes, the display element layer disposed between the upper substrate and the lower substrate, in which the diffractive color filter is disposed on the upper substrate.

The diffractive color filter may be disposed between the upper substrate and the common electrode.

The backlight component may be further configured to emit light at an angle that is inclined with respect to the display panel.

The angle may have an angular measure that is in a range of between 50° and 65° with respect to an incident surface of the display panel.

The backlight component may include a light source and a light guide plate comprising an incident surface upon which light emitted by the light source is incident, an emission surface from which light that has propagated through the incident surface is emitted, and a reflection surface that faces the emission surface.

The light guide plate may be a wedge-type light guide plate in which a distance between the emission surface and the reflection surface decreases as a distance from the light source increases.

The 3D image display apparatus may further include an optical element disposed on the emission surface and configured to adjust a direction in which light emitted from the light guide plate is collimated.

The distance between the emission surface and the reflection surface of the light guide plate may be constant, and an emission pattern for collimating light in a direction and emitting the collimated light may be disposed on the emission surface.

The 3D image display apparatus may further include an optical element disposed on the emission surface and configured to adjust a direction in which light emitted from the light guide plate is collimated.

A tunable optical element may be further disposed on the backlight component, and the tunable optical element may be configurable in a mode in which a direction in which light emitted from the backlight component is collimated is maintained or in a mode in which the light emitted from the backlight component is converted into diffused light.

The tunable optical element may be configurable in one from among a transparent mode and a scattering mode based on whether an electric signal has been applied to the tunable optical element.

According to another aspect of an exemplary embodiment, a method for using a three-dimensional (3D) image display apparatus to generate an image is provided. The 3D image display apparatus includes a backlight component and a display panel, and the display panel includes a diffractive color filter and a display element layer that includes a plurality of pixel regions which are independently controllable. The method includes: providing, by the backlight component, collimated white light; modulating, by the display panel, light received from the backlight component based on image information; performing, by the diffractive color filter, color conversion with respect to white light that has propagated through the display element layer; and diffracting, by the diffractive color filter, the color-converted light toward a plurality of viewing zones of the display panel.

The providing the collimated white light may include emitting, by the backlight component, light at an angle that has an angular measure that is in a range of between 50° and 65° with respect to an incident surface of the display panel.

The 3D image display apparatus may further include a tunable optical element that is disposed on the backlight component. The method may further include configuring the tunable optical element in one from among a first mode in which a direction in which light emitted from the backlight component is collimated is maintained and a second mode in which the light emitted from the backlight component is converted into diffused light.

The method may further include configuring the tunable optical element in one from among a transparent mode and a scattering mode based on whether an electric signal has been applied to the tunable optical element.

According to another aspect of an exemplary embodiment, an image display apparatus is provided. The image display apparatus includes: a light source configured to irradiate white light; a collimator configured to collimate the irradiated white light; and a display panel configured to modulate the collimated light. The display panel includes a diffractive color filter configured to filter the irradiated white light and to diffract the filtered light in at least one predetermined direction.

The diffractive color filter may include a color filter array layer and a diffractive element that is disposed adjacent to the color filter array layer such that the light that has propagated through the color filter array layer is incident to the diffractive element.

In the diffractive color filter, the color filter array layer and the diffractive element may be formed integrally with respect to each other, and the color filter array layer and the diffractive element may be formed of a same material.

The diffractive element may include a plurality of diffractive element components, each of which includes a plurality of sections, a number of which is equal to a number of directions included in the at least one predetermined direction. Each of the plurality of sections may include a respective grating element configured to adjust a directivity of light that is incident thereto.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described with reference to the accompanying drawings. Throughout the drawings, like reference numerals refer to like elements, and each element may be exaggerated in size for clarity and convenience of a description. Meanwhile, the following exemplary embodiments are merely illustrative, and various modifications may be possible from the exemplary embodiments.

An expression such as "above" or "on" may include not only the meaning of "immediately on in a contact manner", but also the meaning of "on in a non-contact manner".

Terms such as first, second, and the like may be used to describe various elements, but the elements should not be limited to those terms. The terms are used to distinguish one element from another element.

As used herein, the singular forms are intended to include the plural forms as well, unless the context clearly indicates otherwise. When a part "includes" an element, it means that the part may further include another element rather than excluding another element, unless indicated otherwise.

The term used in the exemplary embodiments such as "unit" or "module" indicates a unit for processing at least one function or operation, and may be implemented in hardware, software, or in a combination of hardware and software.

Figure 1:
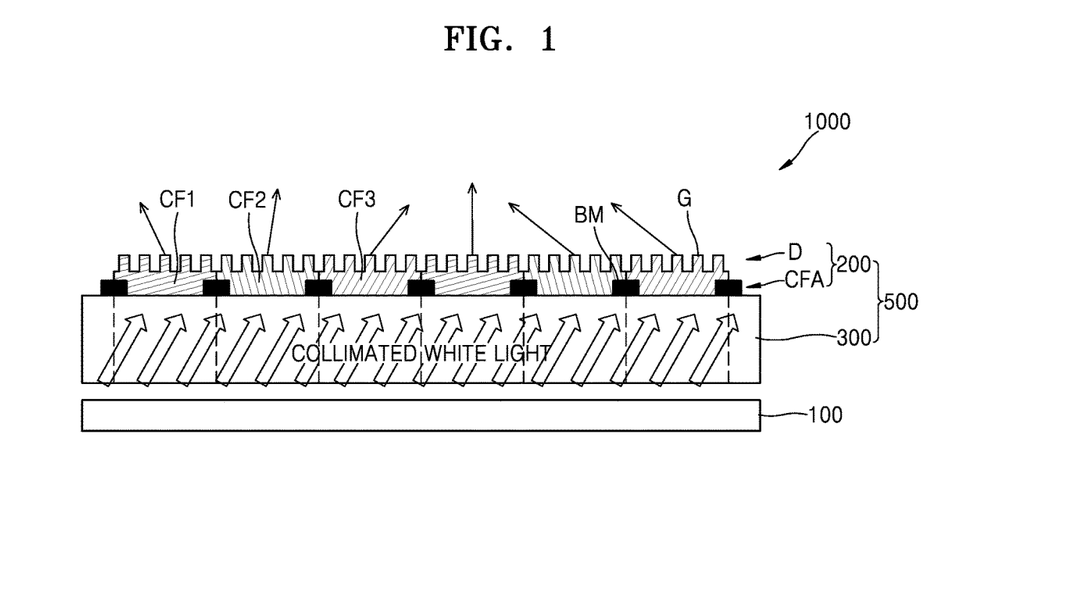
FIG. 1 is a cross-sectional view illustrating a schematic structure of a 3D image display apparatus, according to an exemplary embodiment.

FIG. 1 is a cross-sectional view illustrating a schematic structure of a three-dimensional (3D) image display apparatus 1000, according to an exemplary embodiment.

Referring to FIG. 1, the 3D image display apparatus 1000 may include a backlight unit (also referred to herein as a "backlight component") 100 and a display panel 500 that modulates light received from the backlight unit 100 based on image information. The display panel 500 may include a display element layer 300 and a diffractive color filter 200.

The backlight unit 100 provides light to be modulated by the display panel 500 for image display. The backlight unit 100 may include a light source, a light guide plate, and other various types of optical elements to provide white light, collimated in a direction, to the display panel 500, as will be described in detail below. The direction in which light emitted from the backlight unit 100 is collimated may be properly set to facilitate a diffraction direction adjustment for each position by the diffractive color filter 200. For example, the direction of the light emitted from the backlight unit 100 may be set such that the light is incident to the display panel at an inclined angle. The angle may have an angular measure that is in, but is not limited to, a range of between about 50° and about 65° with respect to an incident plane of the display panel 500 or an emission plane of the backlight unit 100.

The display panel 500 may include the display element layer 300 which includes a plurality of pixel regions that are independently controllable and the diffractive color filter 200 that performs color conversion with respect to white light that has propagated through the display element layer 300 and diffracts the light toward a plurality of viewing zones.

The diffractive color filter 200 may include a color filter array layer CFA and a diffractive element D.

The color filter array layer CFA has a structure in which a first color filter CF1, a second color filter CF2, and a third color filter CF3 are repeatedly arrayed. The first color filter CF1, the second color filter CF2, and the third color filter CF3 may be color filters through which red light, green light, and blue light pass, respectively. A black matrix BM may be disposed at each of several positions, including between the first color filter CF1 and the second color filter CF2, between the second color filter CF2 and the third color filter CF3, and between the third color filter CF3 and the first color filter CF1.

The plurality of pixel regions which are independently controllable by the display element layer 300 are indicated by dotted lines, and are disposed to face the first color filter CF1, the second color filter CF2, and the third color filter CF3, respectively.

The diffractive element D may include a plurality of gratings G. The diffractive element D may include a grating pattern set in which the plurality of gratings G are arranged according to a rule. The diffractive element D may be determined to implement an emission direction based on an incident angle and a wavelength of light that is incident to the diffractive element D.

For convenience, it is illustrated in FIG. 1 that each of the plurality of gratings G has an identical width, height, and interval, but the plurality of gratings G may have an arrangement pattern according to another rule in order to facilitate a diffraction of incident light in different directions based on their positions.

Figure 2:
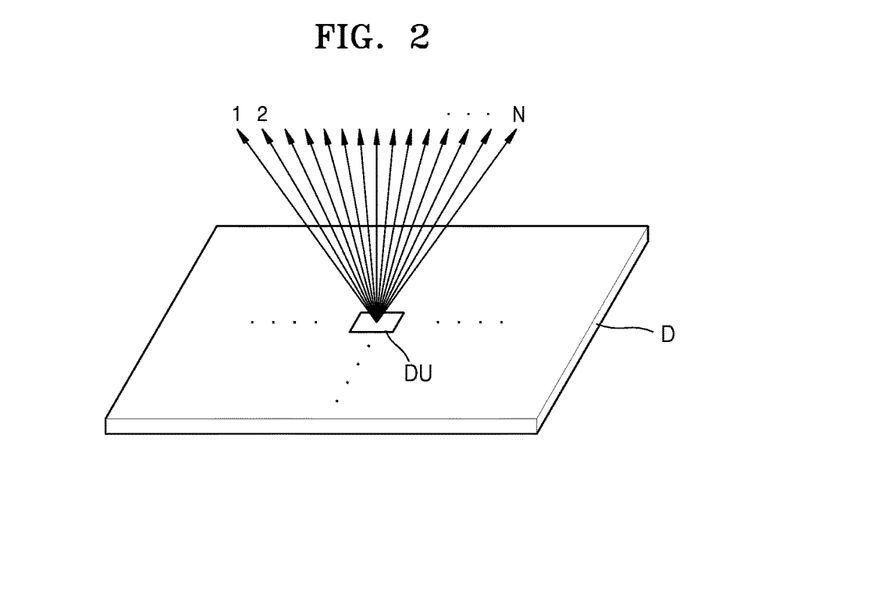
FIG. 2 is a conceptual diagram for describing that a 3D image is recognized by a diffractive element included in a 3D image display apparatus illustrated in FIG. 1, according to an exemplary embodiment.
Figure 3:
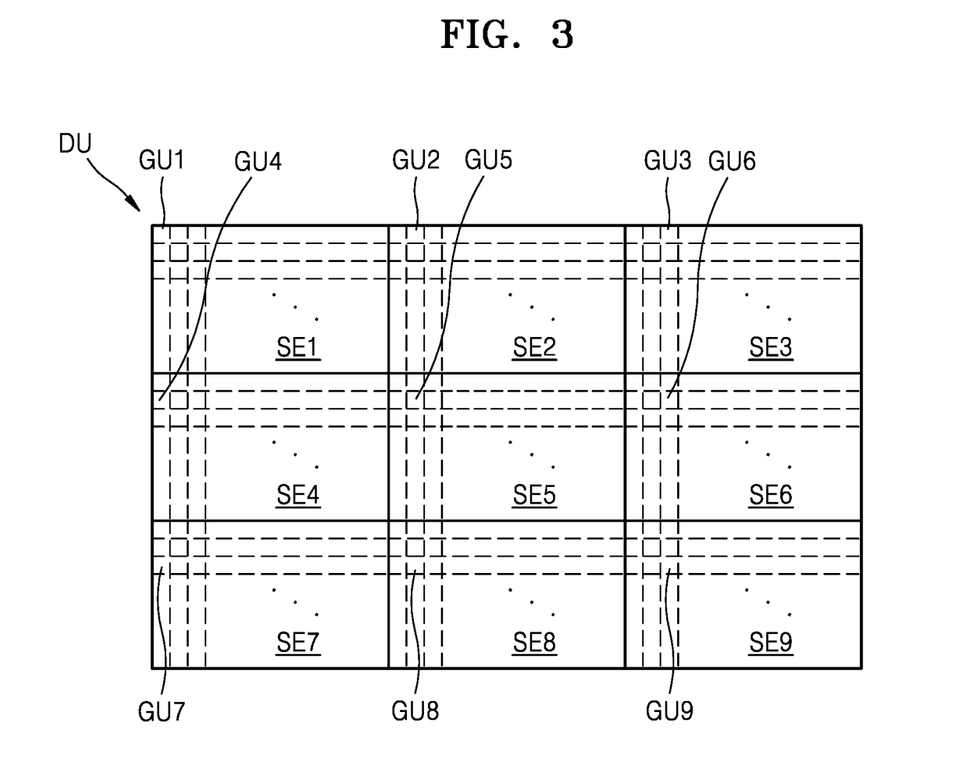
FIG. 3 is a diagram illustrating that a diffractive element unit of a diffractive element included in a 3D image display apparatus illustrated in FIG. 1 includes grating units corresponding to different viewing zones, according to an exemplary embodiment.
Figure 4:
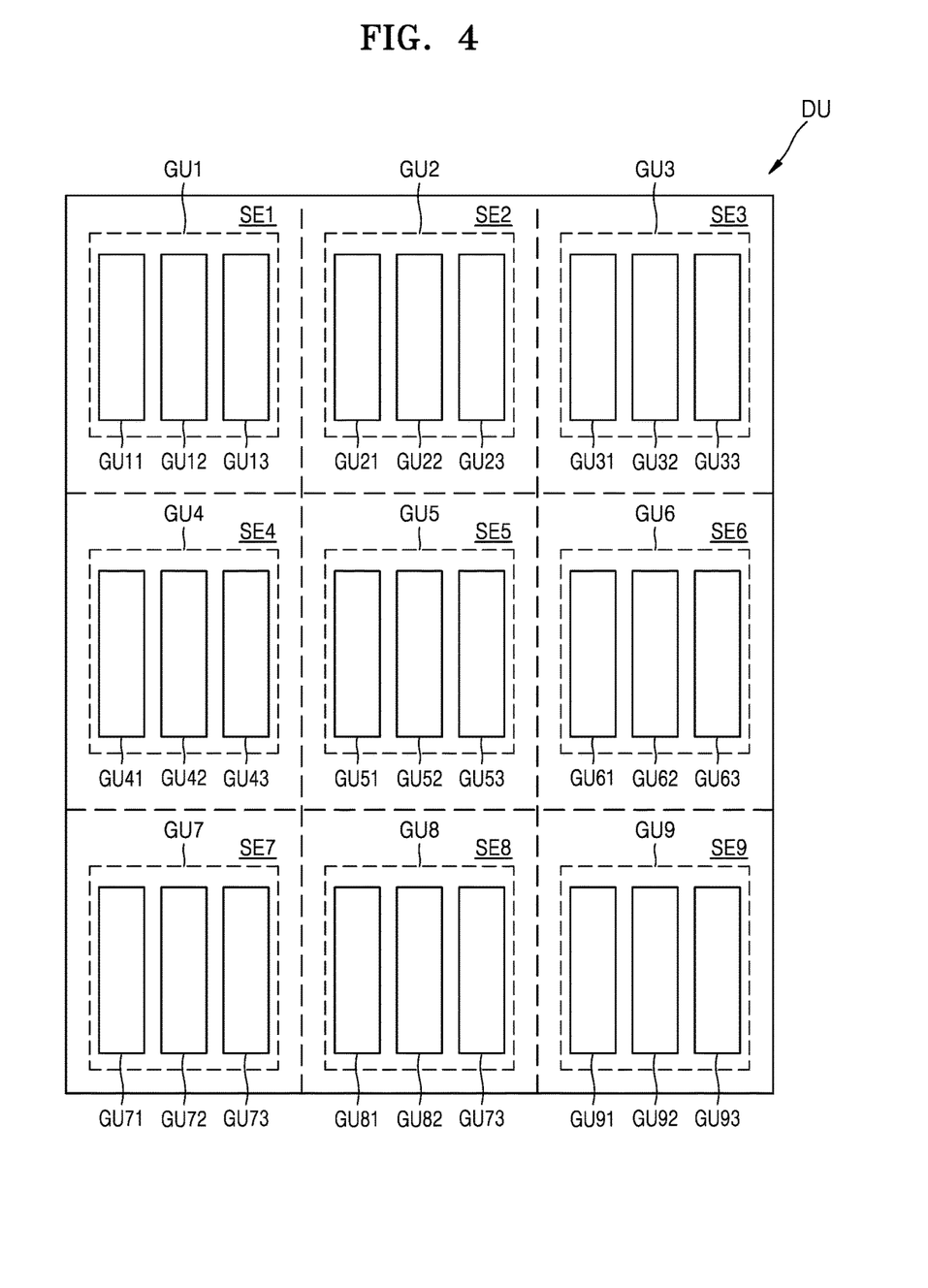
FIG. 4 is a diagram illustrating that each of grating units shown in FIG. 3 includes a plurality of sub grating units, according to an exemplary embodiment.
Figure 5:
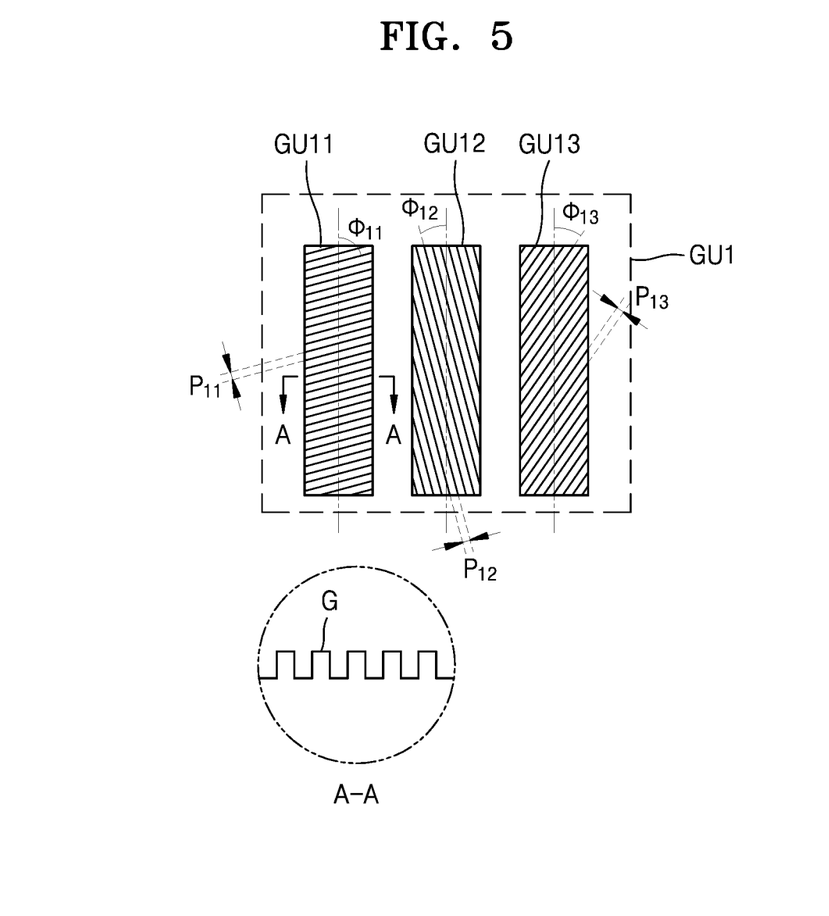
FIG. 5 illustrates a detailed structure of a sub grating unit shown in FIG. 4, according to an exemplary embodiment.

FIG. 2 is a conceptual diagram for describing that a 3D image is recognized by the diffractive element D included in the 3D image display apparatus 1000 illustrated in FIG. 1, according to an exemplary embodiment. FIG. 3 is a diagram illustrating that a diffractive element unit DU of the diffractive element D included in the 3D image display apparatus 1000 illustrated in FIG. 1 includes a grating unit corresponding to different viewing zones, according to an exemplary embodiment. FIG. 4 is a diagram illustrating that the grating unit shown in FIG. 3 includes a plurality of sub grating units, according to an exemplary embodiment. FIG. 5 illustrates a detailed structure of the sub grating unit shown in FIG. 4, according to an exemplary embodiment.

Referring to FIG. 2, the diffractive element D may include a plurality of diffractive element units DU arranged repeatedly. The diffractive element unit DU includes a grating pattern which is configured for diffracting light toward a plurality of viewing zones, that is, includes grating pattern sets having a same number of types as the number of viewing zones. The light incident to the diffractive element unit DU after passing through the display element layer 300 and the color filter array layer CFA shown in FIG. 1 has directivities toward different viewing zones according to a grating pattern formed in the incident position. As shown in FIG. 2, the light is directed toward N viewing zones.

Although one diffractive element unit DU is illustrated in FIG. 2, the diffractive element unit DU may be repeatedly arranged, such that light incident to the diffractive element unit DU after passing through the display element layer 300 and the color filter array layer CFA corresponding to different pixel regions may also have directivities toward N different viewing zones due to a grating pattern formed in the incident position.

As such, the light emitted in different directions may provide correspondingly different views in the plurality of viewing zones to display a 3D image. Herein, a view may indicate an image displayed to an eye of a viewer. However, the exemplary embodiments are not limited to this example, and an image corresponding to two or more views may be provided to an eye of the viewer. A grating pattern set is determined based on the number of views to be formed. The number of plurality of views may be, for example, about 36, about 48, or about 96. Since different views are provided in a plurality of viewing zones, the viewer may recognize a 3D image. As the number of views increases, a space in which a 3D image may be recognized becomes larger and a resolution of each view decreases.

Referring to FIGS. 3 and 4, the diffractive element unit DU may include grating pattern sets having the same number of types as the number of viewing zones so as to diffract light toward the plurality of viewing zones. The diffractive element unit DU includes a plurality of sections SE. The number of sections is equal to the number of viewing zones, N, described as an example as illustrated in FIG. 2. Although nine sections are illustrated in each of FIG. 3 and FIG. 4, this illustration is an example and an exemplary embodiment is not limited to this example.

Each of the plurality of sections SE may include a grating unit (also referred to herein as a "grating element") configured to adjust an emission direction of the light that has propagated through the display element layer 300 as shown in FIG. 1. The plurality of sections SE may include different grating pattern sets. Herein, each section SE may indicate a physically divided region. Each section SE may be a region that is divided based on a grating pattern set.

The diffractive element D may include first through ninth sections SE1, SE2, SE3, SE4, SE5, SE6, SE7, SE8, and SE9. Herein, each section SE may indicate a region in which a grating pattern set is configured differently. For example, the diffractive element D may include nine sections, sixteen sections, or twenty five sections. Various numbers of sections may also be included in the diffractive element D based on the number of views to be formed. The grating pattern set may include a plurality of grating units that may be configured differently from section to section. The first through ninth sections SE1 through SE9 may include first through ninth grating units GU1 through GU9, respectively, that are designed suitably for directivities of the respective sections SE1 through SE9.

FIG. 4 is a diagram illustrating that each of the grating units GU1 through GU9 shown in FIG. 3 includes a plurality of sub grating units (also referred to herein as "grating subelements"), according to an exemplary embodiment.

The first grating unit GU1 may include a first-first sub grating unit GU11, a first-second sub grating unit GU12, and a first-third sub grating unit GU13. The second grating unit GU2 may include a second-first sub grating unit GU21, a second-second sub grating unit GU22, and a second-third grating unit GU23. The ninth grating unit GU9 may include a ninth-first sub grating unit GU91, a ninth-second sub grating unit GU92, and a ninth-third sub grating unit GU93. In this way, an $i^{th}$ grating unit GUi may include an $i^{th}$-first sub grating unit GUi1, an $i^{th}$-second sub grating unit GUi2, and an $i^{th}$-third sub grating unit GUi3.

An $i^{th}$-$j^{th}$ sub grating unit GUij (i=1, ..., 9, j=1, 2, 3) may indicate a minimum unit of a grating pattern set, and disposed so as to face any one of the first, second, and third color filters CF1, CF2, and CF3 of the color filter array layer CFA.

The sub grating unit may include a grating pattern that varies based on a wavelength band of light. The $i^{th}$-first sub grating unit GUi1 may include a grating pattern that diffracts first-wavelength light (e.g., light in a red wavelength band). The $i^{th}$-second sub grating unit GUi2 may include a grating pattern that diffracts second-wavelength light (e.g., light in a blue wavelength band). The $i^{th}$-third sub grating unit GUi3 may include a grating pattern that diffracts third-wavelength light (e.g., light in a green wavelength band). However, an exemplary embodiment is not limited to this example, and grating patterns corresponding to light in various wavelength bands may be included.

The sub grating units GU11 through GU93 included in the first through ninth grating units GU1 through GU9 are illustrated to have an identical area, but an exemplary embodiment is not limited to this illustration. The sub grating units GU11 through GU93 may have varying areas, and an area ratio may vary from grating unit to grating unit. Alternatively, all of the different grating units may not have a different area ratio, but some grating units may have an identical area ratio for sub grating units. Such details may be determined based on the amount of light emitted from the backlight unit 100 or luminous intensity uniformity of the light for each position.

Referring to FIG. 5, the sub grating units GU11, GU12, and GU13 may include gratings G having different arrangement intervals and arrangement directions. The gratings G of the sub grating unit GU11 may have a pitch $P_{11}$ and an arrangement direction forming an angle $\phi_{11}$ with respect to a reference line which is illustrated as a central axis with respect to a length of the sub grating unit GU11. The gratings G of the sub grating unit GU12 may have a pitch $P_{12}$ and an angle $\phi_{112}$ that indicates a corresponding arrangement direction. The gratings G of the sub grating unit GU13 may have a pitch $P_{13}$ and an angle $\phi_{13}$ that indicates a corresponding arrangement direction.

Although the sub grating units GU11, GU12, and GU13 are illustrated as having different arrangement directions and arrangement intervals in FIG. 5, this illustration is an example, and exemplary embodiments are not limited to the illustration. At least one of an arrangement direction and an arrangement interval of the gratings G included in each of the sub grating units GU11, GU12, and GU13 may vary from sub grating unit to sub grating unit.

In the diffractive element D, interaction occurs between the gratings G and light having a particular wavelength, and light may be emitted in a particular direction based on a combination of a pitch of the gratings G, an arrangement direction of the gratings G, a refractive index of the gratings G, a duty cycle of the gratings G, and a relative angle between a propagation direction of the light and the gratings G.

The gratings G of twenty seven sub grating units GUij (i=1, ..., 9, j=1, 2, 3) included in nine sections may have a pitch $P_{ij}$ and an arrangement direction $\phi_{ij}$. The pitch $P_{ij}$ and an arrangement direction $\phi_{ij}$ are set to implement a different directivity for light having a different wavelength. For example, the sub grating units GU11, GU12, and GU13 may be directed to an identical viewing zone, but may have pitches or arrangement directions, any one of which varies from sub grating unit to sub grating unit, because the sub grating units GU11, GU12, and GU13 are related to light having different wavelengths.

Referring back to FIG. 1, the diffractive element D having a grating pattern for forming a 3D image as described above may be formed integrally with the color filter array layer CFA on the color filter array layer CFA. For example, after the first, second, and third color filters CF1, CF2, and CF3 divided by the black matrix BM are formed, a necessary grating pattern may be formed in each position by using a nano imprinting method, thereby manufacturing the diffractive color filter 200.

Formation of the diffractive element D on the color filter array layer CFA may provide several benefits when compared to formation of the diffractive element D in another position, e.g., on a light guide plate of a backlight unit.

When the diffractive element D is disposed on the light guide plate of the backlight unit, light diffracted after propagating through the light guide plate is directed toward a color filter region that is set for each position. There are many layers of a display panel between the light guide plate and the color filter, which complicates an optical path. Moreover, directional light diffracted by the diffractive element is slightly diffused while propagating through many layers, thus being incident to another color filter region as well as a corresponding color filter region. The light incident to the another color filter region may not pass through that region, resulting in a loss of light.

In the current exemplary embodiment, the diffractive element D is disposed on the color filter array layer CFA, such that collimated white light provided by the backlight unit 100 is color-converted and at the same time is diffracted after propagating through the display element layer 300, thus having directivity. Consequently, the complexity of the optical path is reduced and the efficiency of the light may be improved.

Figure 6:
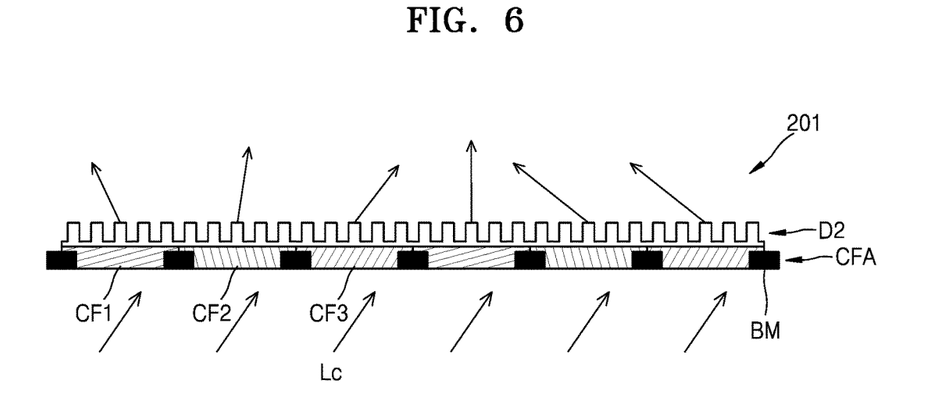
FIG. 6 is a cross-sectional view illustrating a schematic structure of a diffractive color filter employed in a 3D image display apparatus, according to another exemplary embodiment.

FIG. 6 is a cross-sectional view illustrating a schematic structure of a diffractive color filter employed in a 3D image display apparatus, according to another exemplary embodiment.

A diffractive color filter 201 may include a color filter array layer CFA and a diffractive element D2. Unlike the display apparatus illustrated in FIG. 1, the diffractive element D2 may be formed of a material that is different from that of the color filter array layer CFA on the color filter array layer CFA. The material of the diffractive element D2 may have a refractive index that is the same as or different from that of the material of the color filter array layer CFA.

The diffractive color filter 201 may be manufactured by applying a material that is suitable for formation of the diffractive element D2 onto the color filter array layer CFA and then forming the diffractive element D2 having a grating pattern based on a preset rule by using the nano imprinting method. The material of the diffractive element D2 may include photo-curable polymer, e.g., ultraviolet (UV)-curable polymer.

Figure 7:
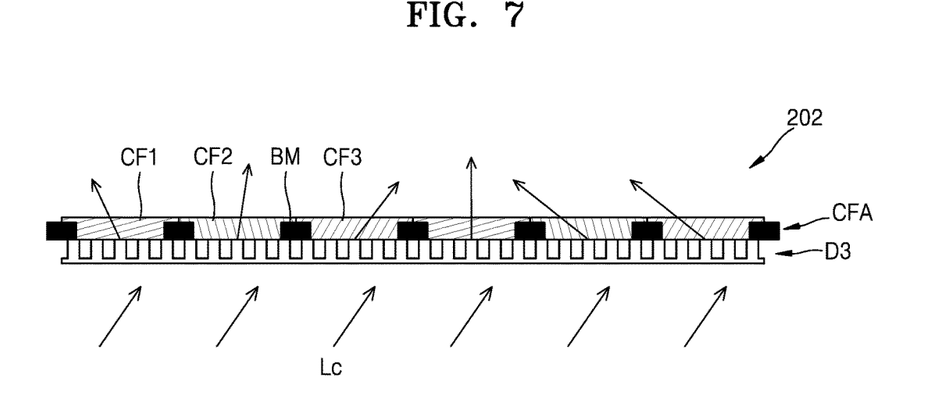
FIG. 7 is a cross-sectional view illustrating a schematic structure of a diffractive color filter employed in a 3D image display apparatus, according to another exemplary embodiment.

FIG. 7 is a cross-sectional view illustrating a schematic structure of a diffractive color filter 202 employed in a 3D image display apparatus, according to another exemplary embodiment.

The diffractive color filter 202 is different from the diffractive color filter 200 of FIG. 1 in an arrangement order of the color filter array layer CFA and a diffractive element D3. In the diffractive color filter 202, the color filter array layer CFA and the diffractive element D3 are arranged such that collimated light $L_c$ that propagates through a display element layer (300 of FIG. 1) is diffracted by the diffractive element D3 and then is incident to the color filter array layer CFA. That is, the collimated light $L_c$ is assigned directivity by the diffractive element D3 and then is incident to the color filter array layer CFA for color conversion.

Figure 8:
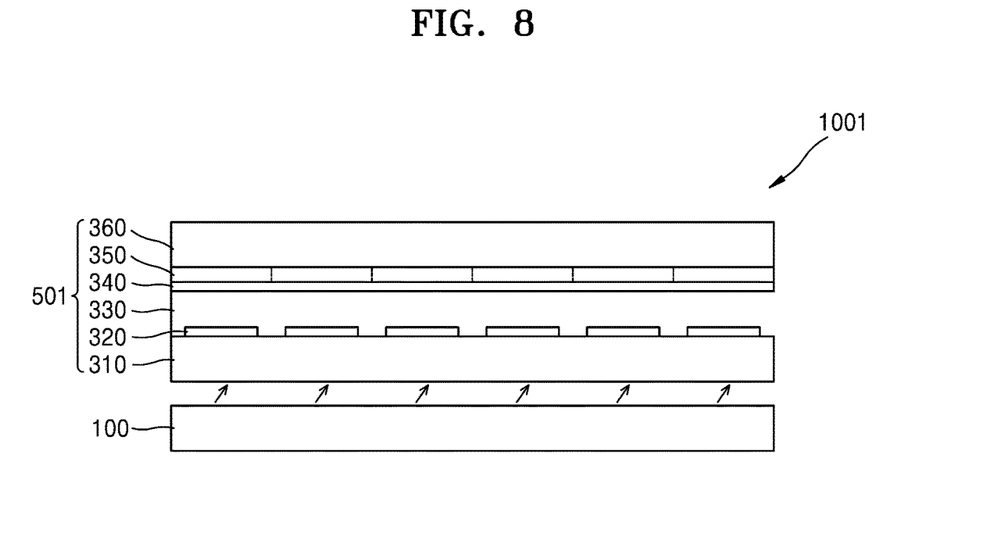
FIG. 8 is a cross-sectional view illustrating a schematic structure of a 3D image display apparatus, according to another exemplary embodiment.

FIG. 8 is a cross-sectional view illustrating a schematic structure of a 3D image display apparatus 1001, according to another exemplary embodiment.

The 3D image display apparatus 1001 may include the backlight unit 100 that provides collimated light and a display panel 501 that modulates the light received from the backlight unit 100.

The display panel 501 may include a lower substrate 310 in which a plurality of pixel electrodes 320 are formed, an upper substrate 360 in which a common electrode 340 that faces the plurality of pixel electrodes 320 is formed, and a display element layer 330 disposed between the upper substrate 360 and the lower substrate 310. The display element layer 330 may be, for example, a liquid crystal layer that is capable of controlling a transmittance of incident light under electric control.

A diffractive color filter 350 is disposed on the upper substrate 360. For example, the diffractive color filter 350 may be disposed between the common electrode 340 and the upper substrate 360.

The diffractive color filter 350 includes a color filter array layer and a diffractive element, and may use any one of the diffractive color filters 200, 201, and 202.

Figure 9:
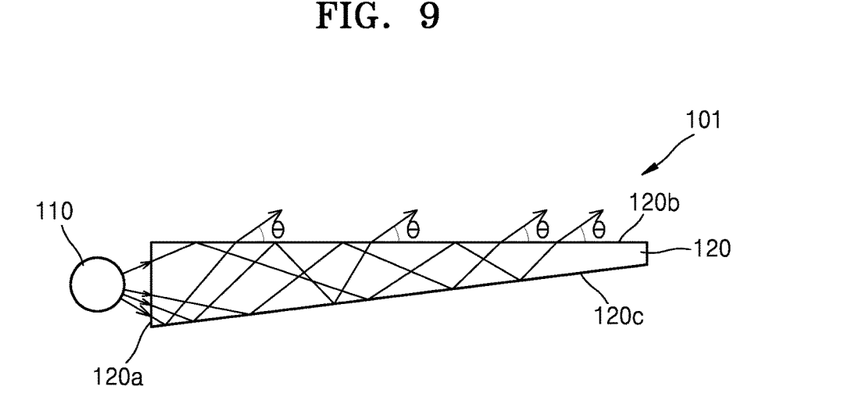
FIG. 9 is a cross-sectional view illustrating a structure of a backlight unit employed in a 3D image display apparatus, according to exemplary embodiments.

FIG. 9 is a cross-sectional view illustrating a structure of the backlight unit 101 employed in a 3D image display apparatus, according to exemplary embodiments.

The backlight unit 101 may include a light source 110 and a light guide plate 120.

The light source 110 may be disposed so as to face at least one side of the light guide plate 120. The light source 110 may irradiate light in at least one wavelength band. For example, the light source 110 may include a light-emitting diode (LED) or a laser diode (LD). A plurality of LEDs or LDs may be arranged so as to irradiate light in at least one direction with respect to the light guide plate 120. The plurality of LEDs or LDs may irradiate white light or may irradiate light having different wavelengths to form white light.

The light guide plate 120 causes light irradiated from the light source 110 to propagate through internal total reflection and then emits the light through an emission plane 120b on the light guide plate 120. The light guide plate 120 may include an incident surface 120a upon which light is incident from the light source 110 and an emission surface 120b from which the light that has propagated through the incident surface 120a is emitted after propagating through the light guide plate 120. The light guide plate 120 may also include a reflection surface 120c facing the emission surface 120b. The reflection surface 120c may be a total-reflection surface that totally reflects light when the light arriving at the reflection surface 120c satisfies a total-reflection condition. On a bottom portion of the reflection surface 120c, a reflection member (not shown) that reflects light that has propagated through the reflection surface 120c without being totally reflected may be disposed.

The light guide plate 120 has a shape in which a thickness thereof gradually changes instead of being constant. For example, the light guide plate 120 may be a wedge-type light guide plate in which a distance between the emission surface 120b and the reflection surface 120c decreases in a direction away from the light source 110, i.e., the distance between the emission surface 120b and the reflection surface 120c decreases as the corresponding distance from the light source 110 increases.

The wedge-type light guide plate is provided such that the light emitted from the emission surface 120b has a constant emission angle. The light provided from the light source 110 is incident to the light guide plate 120 at the incident surface 120a and is totally reflected, and travels in the light guide plate 120. Then, if the light is incident to the emission surface 120b at an angle that is smaller than a total-reflection critical angle, the light is emitted through the emission surface 120b. For example, the light provided from the light source 110 is totally reflected from the reflection surface 120c and is incident to the emission surface 120b at an angle that is larger than the total-reflection critical angle, thus being totally reflected, and then is totally reflected from the reflection surface 120c, thus being incident to the emission surface 120b. When this process is repeated, an angle at which the light arrives at the emission surface 120b, that is, an angle formed between the light and a normal line of the emission surface 120b gradually decreases as the number of occurrences of total reflection is repeated, such that the light arrives at the emission surface 120b at an angle that is smaller than a total-reflection critical angle. The light arriving at the emission surface 120b at an angle that is smaller than the total-reflection critical angle is emitted through the emission surface 120b. According to this process, the light emitted through the emission surface 120b has an angle θ that is inclined with respect to the emission surface 120b such that the light may be emitted as light collimated in one direction.

The angle θ may be set properly to facilitate a respective diffraction direction adjustment for each position in the aforementioned diffractive color filters 200, 201, 202, and 340. For example, the angle θ may have an angular measure that is in, but is not limited to, a range from about 50° to about 65°.

Figure 10:
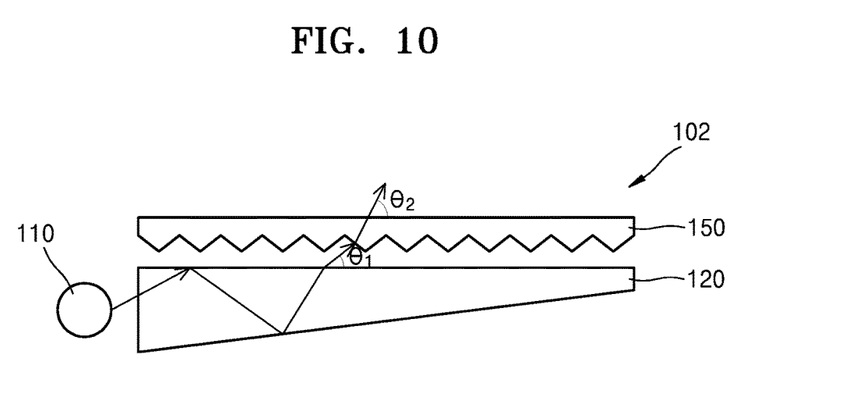
FIG. 10 is a cross-sectional view illustrating a structure of a backlight unit employed in a 3D image display apparatus, according to exemplary embodiments.

FIG. 10 is a cross-sectional view illustrating a structure of a backlight unit 102 employed in a 3D image display apparatus, according to exemplary embodiments.

On the light guide plate 120, that is, on an optical path of the light emitted from the emission surface 120b, an optical element 150 may be disposed. The optical element 150 may adjust an angle at which the light emitted from the light guide plate 120 is collimated.

A grating pattern provided in a diffractive element included in the diffractive color filters 200, 201, 202, and 340 is designed based on an angle at which light emitted from the backlight unit 102 is collimated, such that it may be necessary to precisely adjust a direction in which the light emitted from the backlight unit 102 is collimated. To this end, the optical element 150 may be further included.

The optical element 150 may adjust an angle $\theta_1$ at which the light emitted from the light guide plate 120 is collimated, to an angle $\theta_2$. The optical element 150 may be a reverse prism sheet in which a surface upon which the light emitted from the light guide plate 120 is incident includes a plurality of prisms. Although the prisms are illustrated as having a constant size and shape, this illustration is an example and exemplary embodiments are not limited to this example. For example, a size of a prism may vary based on a distance from the light source 110 according to a rule.

Figure 11:
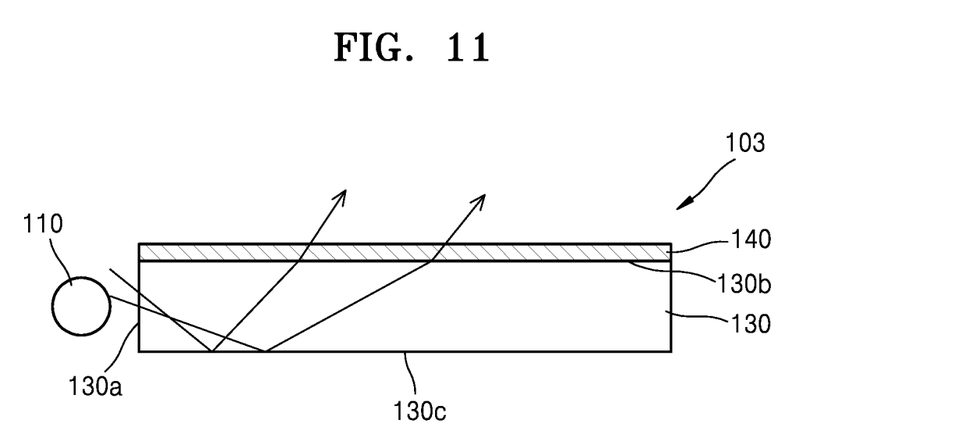
FIG. 11 is a cross-sectional view illustrating a structure of a backlight unit employed in a 3D image display apparatus, according to exemplary embodiments.

FIG. 11 is a cross-sectional view illustrating a structure of a backlight unit 103 employed in a 3D image display apparatus, according to exemplary embodiments.

The backlight unit 103 may include the light source 110, a light guide plate 130, and an emission unit (also referred to herein as an "emitter") 140.

The light guide plate 130 may include an incident surface 130a upon which light is incident, an emission surface 130b from which the light is emitted, and a reflection surface 130c from which the light is reflected.

The light source 110 is illustrated as being disposed on a side that faces the incident surface 130a, but an exemplary embodiment is not limited to this illustration. For example, an additional light source may be disposed such that the light is incident to the light guide plate 130 through a surface that faces the incident surface 130a.

In the current exemplary embodiment, the light guide plate 130 may have a constant thickness. In particular, a distance between the emission surface 130b and the reflection surface 130c is constant regardless of a distance from the light source 110. The light, which propagates through the incident surface 130a and arrives at the reflection surface 130c at an angle that is larger than a total-reflection critical angle, also arrives at the emission surface 130b at an angle that is larger than the total-reflection critical angle. Thus, for emitting light, the emission unit 140 may be provided on the emission surface 130b. The emission unit 140 may include an emission pattern for emitting the light, which travels in the light guide plate 130 and then arrives at the emission unit 140, to the outside. The emission pattern may have a shape in which the emitted light is collimated in one direction.

Figure 12:
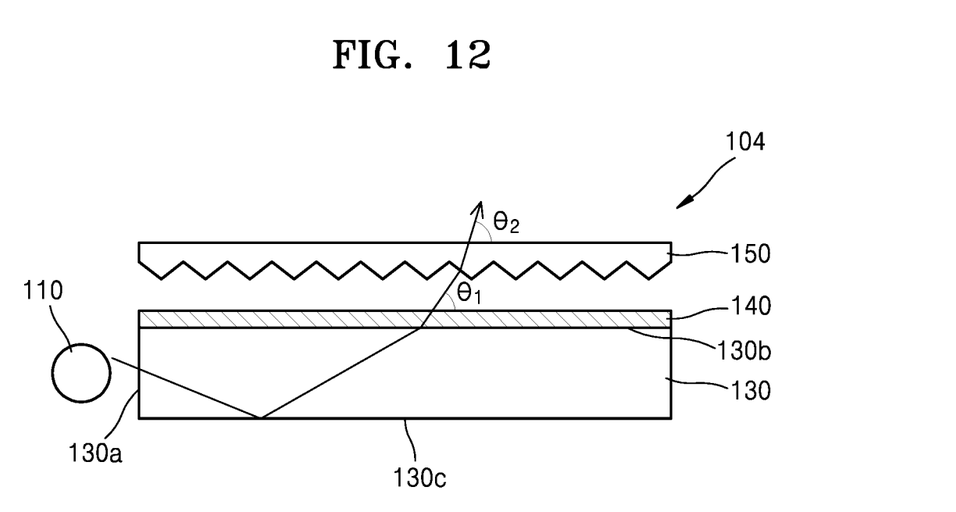
FIG. 12 is a cross-sectional view illustrating a structure of a backlight unit employed in a 3D image display apparatus, according to exemplary embodiments.

FIG. 12 is a cross-sectional view illustrating a structure of a backlight unit 104 employed in a 3D image display apparatus, according to exemplary embodiments.

On the light guide plate 130, that is, on an optical path of light that has propagated through the emission unit 140, the optical element 150 may be disposed. The optical element 150 adjusts an angle at which the light emitted from the light guide plate 130 is collimated.

A grating pattern included in a diffractive element included in the aforementioned diffractive color filters 200, 201, 202, and 340 is designed based on an angle at which the light emitted from the backlight unit 104 is collimated, such that it may be necessary to precisely adjust a direction in which the light emitted from the backlight unit 104 is collimated. To this end, the optical element 150 may be further disposed.

The optical element 150 may adjust the angle $\theta_1$ at which the light emitted from the emission unit 140 is collimated, to the angle $\theta_2$. The optical element 150 may be a reverse prism sheet in which a surface upon which the light emitted from the emission unit 140 is incident includes a plurality of prisms. Although the prisms are illustrated as having a constant size and shape, this illustration is an example and exemplary embodiments are not limited to this example. For example, a size of a prism may vary based on a distance from the light source 110 according to a rule.

Figure 13:
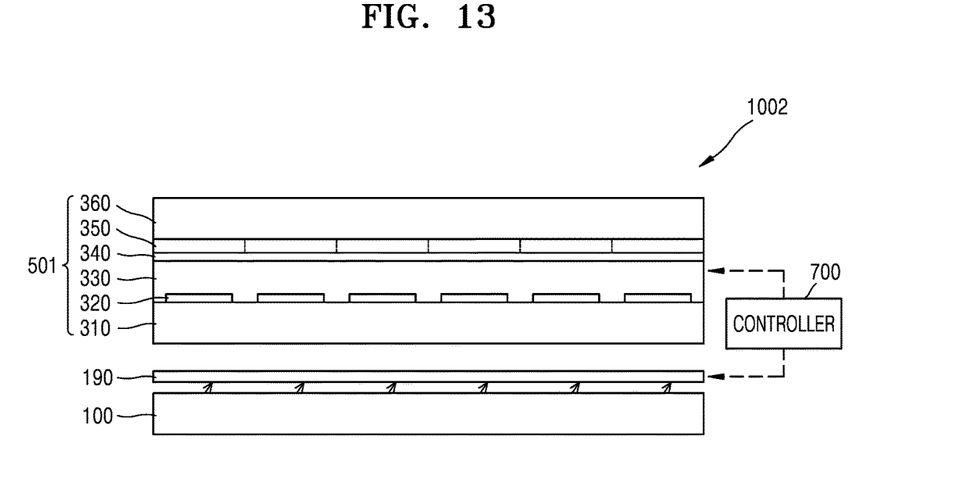
FIG. 13 is a cross-sectional view illustrating a schematic structure of a 3D image display apparatus, according to another exemplary embodiment.

FIG. 13 is a cross-sectional view illustrating a schematic structure of a 3D image display apparatus 1002, according to another exemplary embodiment.

The 3D image display apparatus 1002 according to the current exemplary embodiment is a 3D image display apparatus that is capable of displaying a 2D image and a 3D image in a switchover manner.

The 3D image display apparatus 1002 may include the backlight unit 100 and the display panel 501. On the backlight unit 100, a tunable optical element 190 may be disposed, and the tunable optical element 190 may be configured to adjust light provided to the display panel 501 to collimated light or diffused light.

The tunable optical element 190 may maintain a direction in which the light provided from the backlight unit 100 is collimated, or may convert the light into diffused light, according to a control signal of a controller 700. For example, the tunable optical element 190 may be switched to one of a transparent mode and a scattering mode based on whether an electric signal has been applied to the tunable optical element 190.

Figure 14:
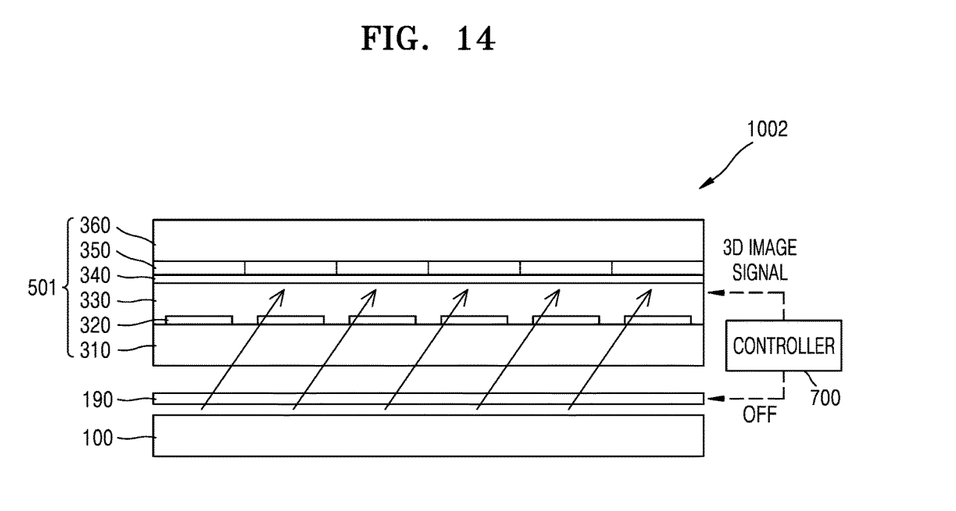
FIGS. 14 and 15 are diagrams illustrating that a 3D image display apparatus implements a 3D image and a 2D image under control of a tunable optical element, according to an exemplary embodiment.
Figure 15:
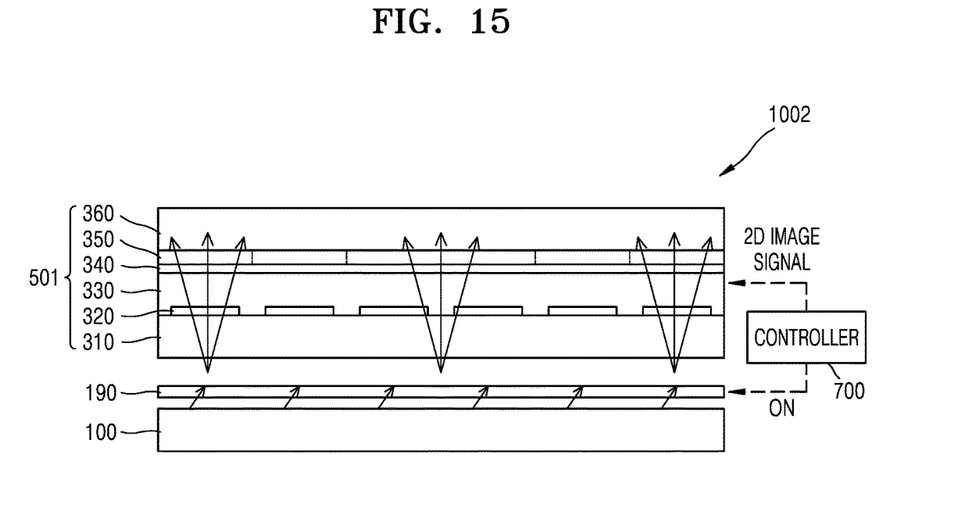

FIGS. 14 and 15 are diagrams illustrating that the 3D image display apparatus 1002 of FIG. 13 implements a 3D image and a 2D image under control of the tunable optical element 190, according to an exemplary embodiment.

Referring to FIG. 14, the controller 700 controls the tunable optical element 190 in a mode in which an OFF signal is applied to the tunable optical element 190, that is, a direction of the collimated light provided from the backlight unit 100 is maintained. The controller 700 also controls the display panel 501 such that the incident light is modulated based on a 3D image signal.

The collimated light provided from the backlight unit 100 is incident upon the display panel 501 and is modulated on a pixel basis, and is color-converted and is assigned directivity by the diffractive color filter 340, thus being directed toward a corresponding viewing zone. In this manner, different views are provided to a plurality of viewing zones, such that a 3D image may be perceived.

Referring to FIG. 15, the controller 700 controls the tunable optical element 190 in a mode in which an ON signal is applied to the tunable optical element 190, that is, a mode in which the collimated light provided from the backlight unit 100 is scattered for conversion into diffused light. The controller 700 also controls the display panel 501 such that the incident light is modulated based on a 2D image signal.

The collimated light provided from the backlight unit 100 is converted into diffused light and is incident upon the display panel 501 for pixel-based modulation. Next, the light incident to the diffractive color filter 340 is color-converted, but the light is incident to the diffractive element in a random direction and thus is not given directivity, such that an identical image having no separation between viewing zones is generated. In this aspect, although the diffractive element of the diffractive color filter 340 includes a grating pattern set for forming a plurality of views, light in a form that does not correspond to an incident angle for forming the plurality of views is incident, such that the plurality of views varying with viewing zones are not formed and thus a 2D image is perceived.

As is apparent from the foregoing description, the 3D image display apparatus may form directivity by using optical diffraction, thereby forming a 3D image.

Moreover, the 3D image display apparatus improves the efficiency of light by employing a diffractive color filter in which a diffractive element for forming directivity is disposed on a color filter.

Furthermore, the 3D image display apparatus converts light provided from a backlight unit into collimated light or diffused light, thereby selectively displaying a 2D image and/or a 3D image.

While the 3D image display apparatus has been shown and described in connection with the exemplary embodiments, it will be apparent to those of ordinary skill in the art that modifications and variations can be made without departing from the spirit and scope of the exemplary embodiments as defined by the appended claims. Therefore, the disclosed exemplary embodiments should be considered in an illustrative sense rather than a restrictive sense. The range of the exemplary embodiments will be in the appended claims, and all of the differences in the equivalent range thereof should be understood to be included in the exemplary embodiments.

What is claimed is:

1. A three-dimensional (3D) image display apparatus comprising:
    a backlight component configured to provide collimated white light; and
    a display panel configured to modulate light received from the backlight component based on image information,
    wherein the display panel comprises:
        a display element layer comprising a plurality of pixel regions which are independently controllable; and
        a diffractive color filter configured to perform color conversion with respect to white light that has propagated through the display element layer and to diffract the light toward a plurality of viewing zones,
    wherein the diffractive color filter comprises a color filter array layer and a diffractive element that is disposed adjacent to the color filter array layer,
    wherein the diffractive element comprises a plurality of diffractive element components disposed repeatedly,
    wherein each of the plurality of diffractive element components comprises a plurality of sections, a number of which is equal to a number of the plurality of viewing zones,
    wherein each of the plurality of sections comprises a respective grating element configured to uniquely adjust a direction of the light with respect to each of the plurality of viewing zones to provide a plurality of different views in each of the plurality viewing zones, and
    wherein a 3D image is conceived by at least two different views among the plurality of different views.

2. The 3D image display apparatus of claim 1, wherein in the diffractive color filter, the color filter array layer and the diffractive element are disposed such that the light that has propagated through the display element layer propagates through the color filter array layer and is incident to the diffractive element.

3. The 3D image display apparatus of claim 2, wherein in the diffractive color filter, the color filter array layer and the diffractive element are formed integrally with respect to each other.

4. The 3D image display apparatus of claim 1, wherein in the diffractive color filter, the color filter array layer and the diffractive element are disposed such that the light that has propagated through the display element layer is diffracted by the diffractive element and is incident to the color filter array layer.

5. The 3D image display apparatus of claim 1, wherein each of the diffractive element and the color filter array layer is formed of a same material.

6. The 3D image display apparatus of claim 1, wherein the diffractive element is formed of a photo-curable polymer material.

7. The 3D image display apparatus of claim 1,
    each respective grating element comprises a plurality of grating subelements.

8. The 3D image display apparatus of claim 7, wherein the color filter array layer is formed by repeatedly arranging a plurality of color filters configured to facilitate a propagation of light in different colors, and wherein each respective one from among the plurality of color filters is disposed to face a corresponding one from among the plurality of grating sub elements.

9. The 3D image display apparatus of claim 8, wherein gratings included in each of the plurality of grating subelements have an arrangement direction and an arrangement interval, at least one of which varies from grating subelement to grating subelement.

10. The 3D image display apparatus of claim 1, wherein the display panel comprises:

a lower substrate in which a plurality of pixel electrodes are formed;

an upper substrate in which a common electrode is formed and is disposed to face the plurality of pixel electrodes; and the display element layer disposed between the upper substrate and the lower substrate, wherein the diffractive color filter is disposed on the upper substrate.

11. The 3D image display apparatus of claim 10, wherein the diffractive color filter is disposed between the upper substrate and the common electrode.

12. The 3D image display apparatus of claim 1, wherein the backlight component is further configured to emit light at an angle that is inclined with respect to the display panel.

13. The 3D image display apparatus of claim 12, wherein the angle has an angular measure that is in a range of between 50° and 65° with respect to an incident surface of the display panel.

14. The 3D image display apparatus of claim 1, wherein the backlight component comprises:

a light source; and a light guide plate comprising an incident surface upon which light emitted by the light source is incident, an emission surface from which light that has propagated through the incident surface is emitted, and a reflection surface that faces the emission surface.

15. The 3D image display apparatus of claim 14, wherein the light guide plate is a wedge-type light guide plate in which a distance between the emission surface and the reflection surface decreases as a distance from the light source increases.

16. The 3D image display apparatus of claim 15, further comprising:

an optical element disposed on the emission surface and configured to adjust a direction in which light emitted from the light guide plate is collimated.

17. The 3D image display apparatus of claim 14, wherein a distance between the emission surface and the reflection surface is constant, and an emission pattern for collimating light in a direction and emitting the collimated light is disposed on the emission surface.

18. The 3D image display apparatus of claim 17, further comprising:

an optical element disposed on the emission surface and configured to adjust a direction in which light emitted from the light guide plate is collimated.

19. A three-dimensional (3D) image display apparatus comprising:

a backlight component configured to provide collimated white light, and a display panel configured to modulate light received from the backlight component based on image information, wherein the display panel comprises:

a display element layer comprising a plurality of pixel regions which are independently controllable; and a diffractive color filter configured to perform color conversion with respect to white light that has propagated through the display element layer and to diffract the light toward a plurality of viewing zones, wherein the diffractive color filter comprises a plurality of grating elements, each of the plurality of grating elements being differently configured to uniquely adjust a direction of the light with respect to each of the plurality of viewing zones, wherein a tunable optical element is disposed on the backlight component, and the tunable optical element is configurable in a mode in which a direction in which light emitted from the backlight component is collimated is maintained or in a mode in which the light emitted from the backlight component is converted into diffused light.

20. The 3D image display apparatus of claim 19, wherein the tunable optical element is configurable in one from among a transparent mode and a scattering mode based on whether an electric signal has been applied to the tunable optical element.

21. An image display apparatus comprising:

a light source configured to irradiate white light;

a collimator configured to collimate the irradiated white light; and a display panel configured to modulate the collimated light, wherein the display panel comprises a diffractive color filter configured to filter the irradiated white light and to diffract the filtered light in at least two predetermined directions respectively corresponding to two different viewing zones, and wherein the diffractive color filter comprises a color filter array layer and a diffractive element that is disposed adjacent to the color filter array layer, wherein the diffractive element comprises a plurality of diffractive element components disposed repeatedly, wherein each of the plurality of diffractive element components comprises a plurality of sections, a number of which is equal to a number of the plurality of viewing zones, wherein each of the plurality of sections comprises a respective grating element configured to uniquely adjust a direction of the light with respect to each of the plurality of viewing zones to provide a plurality of different views in each of the plurality viewing zones, and wherein a 3D image is conceived by at least two different views among the plurality of different views.

22. The image display apparatus of claim 21, wherein in the diffractive color filter, the color filter array layer and the diffractive element are formed integrally with respect to each other, and the color filter array layer and the diffractive element are formed of a same material.

* * * * *